Figure 1:
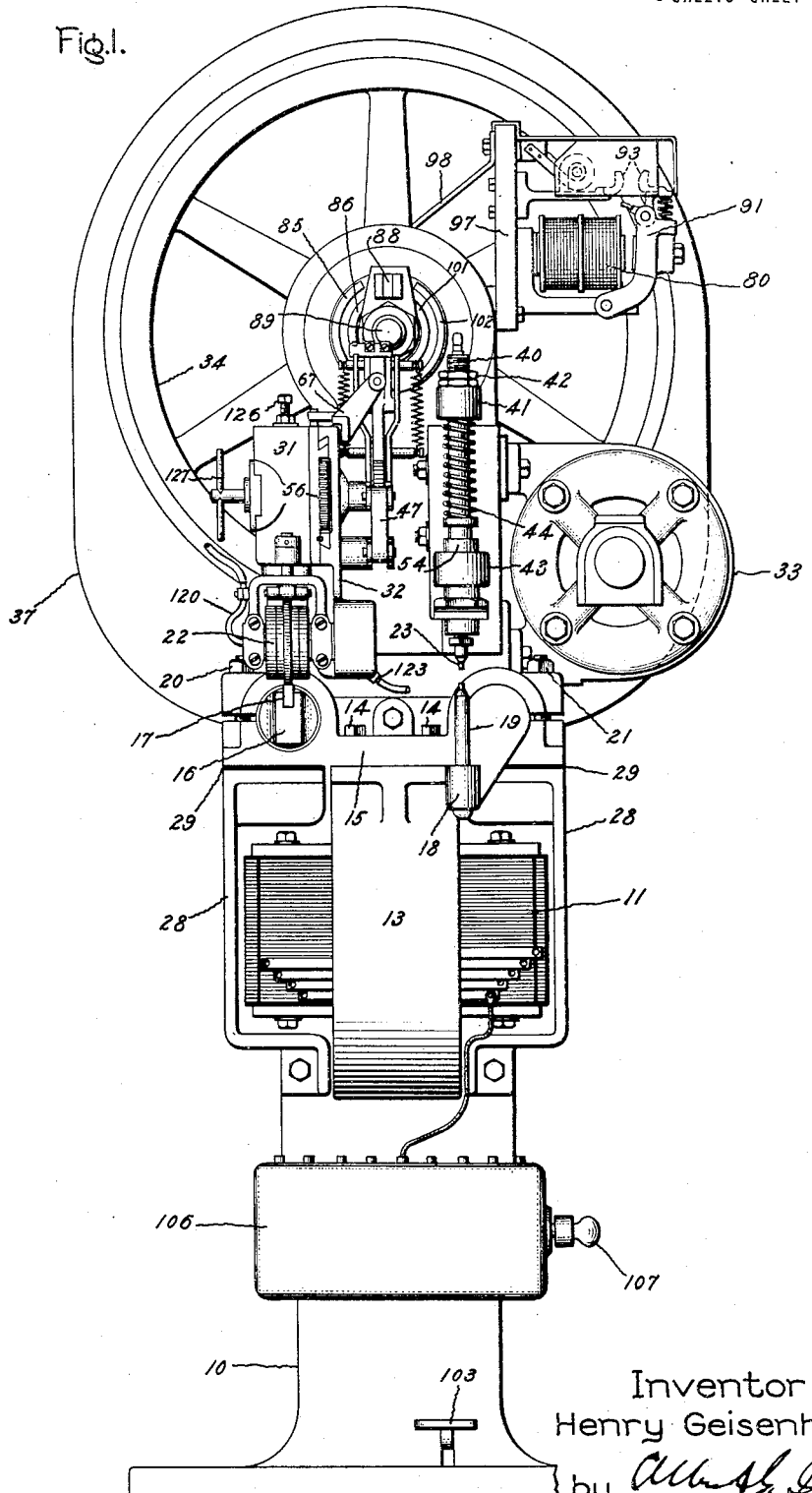

H. GEISENHÖNER.
ELECTRIC WELDING.
APPLICATION FILED APR. 26, 1918.

1,310,070.

Patented July 15, 1919.
3 SHEETS—SHEET 1.

Inventor:
Henry Geisenhöner,
by Albert G. Davis
His Attorney.

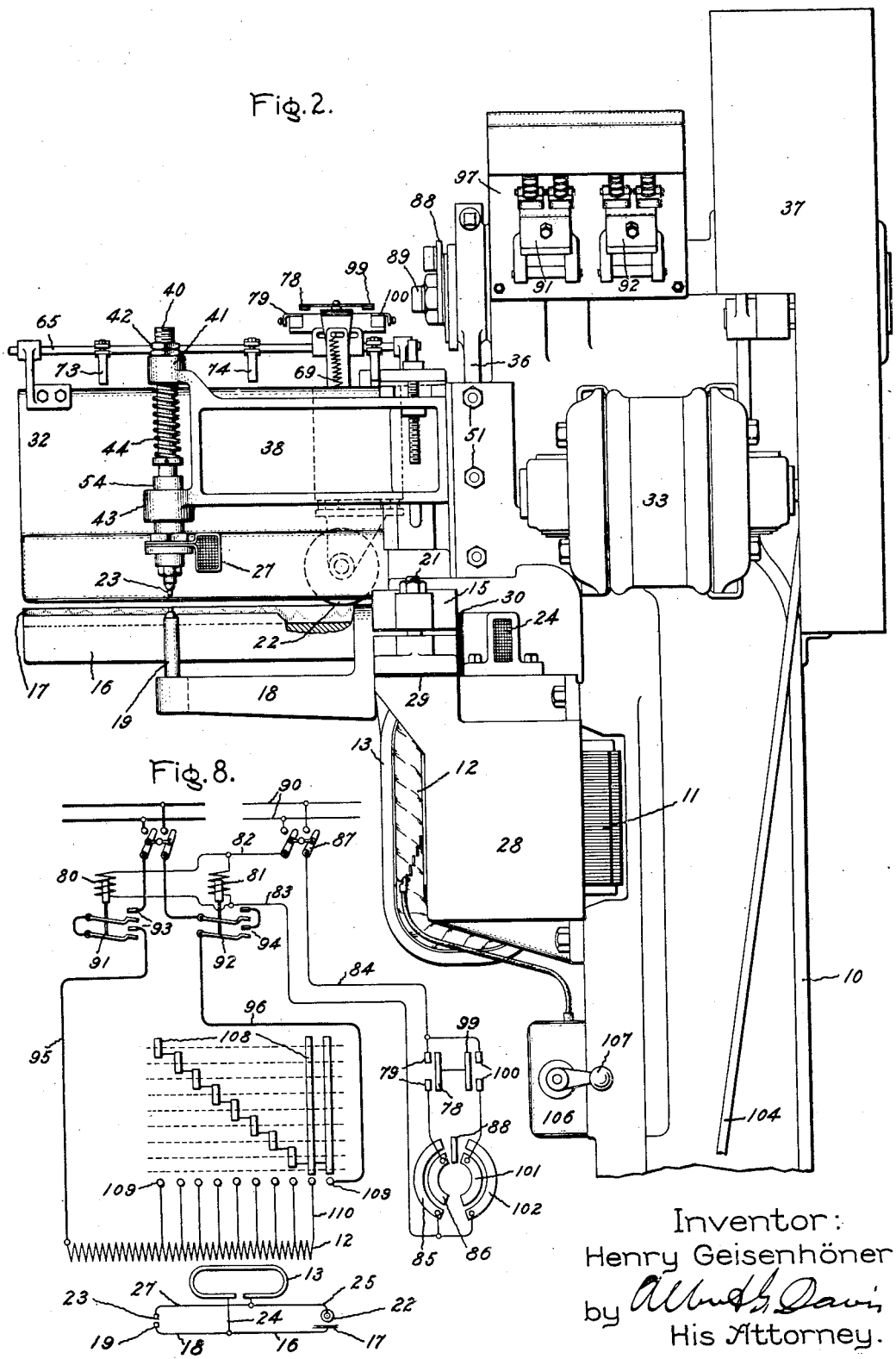

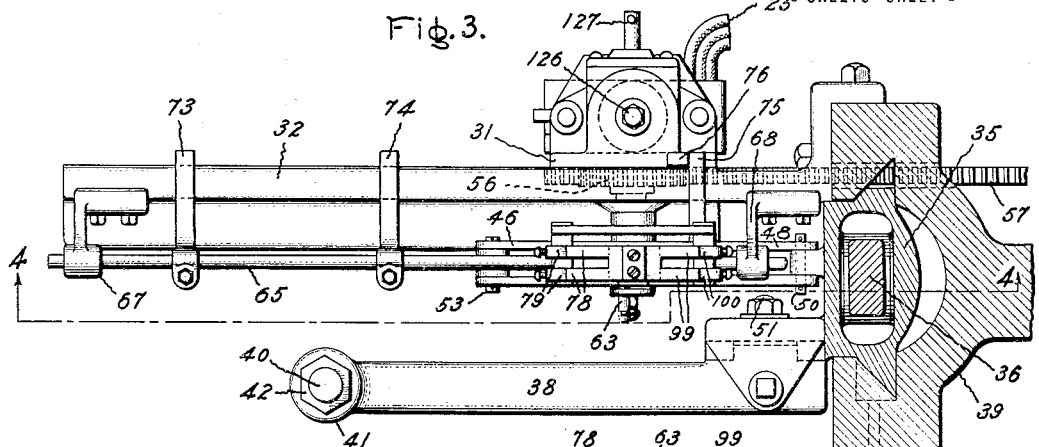

UNITED STATES PATENT OFFICE.

HENRY GEISENHONER, OF SCHENECTADY, NEW YORK, ASSIGNOR TO GENERAL ELECTRIC COMPANY, A CORPORATION OF NEW YORK.

ELECTRIC WELDING.

1,310,070.  Specification of Letters Patent.  Patented July 15, 1919.

Application filed April 26, 1918.  Serial No. 230,948.

*To all whom it may concern:*

Be it known that I, HENRY GEISENHÖNER, a citizen of the United States, residing at Schenectady, in the county of Schenectady, State of New York, have invented certain new and useful Improvements in Electric Welding, of which the following is a specification.

The present invention relates to electric resistance welding, and comprises both a method and apparatus for producing line or seam welds between plates or sheets of metal.

It is one of the objects of my invention to improve the character or quality of the welds. When metal sheets to be welded along a line or seam are very thin and are properly clamped and supported, it has been possible to produce a satisfactory line weld by methods heretofore used but difficulties due to burning and warping of the metal are encountered when parts of considerable thickness are to be welded. In my opinion the burning or overheating of the seam being welded with its attendant difficulties is due mainly to the following causes.

When the feed of an electrode over the work is continuous, the value of the welding current is governed largely by the resistance of the weld and when the welding voltage is chosen high enough to weld the spots of high resistance, too much current will flow at the region of low resistance causing burning.

When stock of considerable thickness is welded and the welding electrode is moved continuously with an application of welding current sufficient to continuously weld, a section of the weld softened by the heating of the welding current is immediately subjected to another increment of heat by the stray current received from the welding of an adjacent section to which the welding electrode has moved before the section previously heated has cooled. The fact that the section of stock thus overheated is no longer subjected to a welding pressure aggravates the difficulty.

In accordance with my invention line welding may be carried out with relatively heavy stock without the above noted difficulties by causing the welding electrode to progress over the work in a step by step manner, and applying a welding current only during the time the electrode is in motion and in welding relation to the work. In my opinion the advantages of this method may be explained by the following considerations:

When the feed of the electrode takes place over a short distance and the period of current application is short, the current is governed very largely by the electrical conditions of the entire welding circuit, that is, the reactance, resistance and capacity of the circuit. Hence the resistance of the parts to be welded may vary without material effect on the weld.

An intermittent feed of the electrode over the work permits the softened parts to unite while still under the pressure of the welding electrode and to cool somewhat before being subjected to additional heating by the welding of the adjacent part or parts.

The welding circuit used to weld with an intermittent feed in accordance with my invention, should have sufficient impedance to control the welding current external to the weld and irrespective of the resistance of the parts being welded. The forward feed of the electrodes should be timed with respect to the welding current to begin when the heating effect of the current has become sufficient to weld and to cease when the heating effect of the current has been reduced to a value insufficient to weld.

The novel features of my invention will be pointed out with greater particularity in the appended claims, and both the method of welding included in the present invention and a novel apparatus for carrying out this method are more fully described in the following specification taken in connection with the accompanying drawings in which:

Figure 1 is a front elevation of a welding machine embodying my invention; Fig. 2 is a side elevation of the machine; Fig. 3 is a plan view partly in section; Fig. 4 is a side elevation partly in section of the line welding head taken on the lines 4—4 of Fig. 3; Fig. 5 is a side elevation of a roller welding electrode and adjacent mechanism; Fig. 6 is a longitudinal section of the apparatus shown in Fig. 5; Fig. 7 is a sectional view of a roller welding electrode, and Fig. 8 is a diagram of electrical circuits of the apparatus.

Referring to Figs. 1 and 2, the welding machine comprises a frame 10 on which is mounted a welding transformer comprising a magnetic core 11, a primary winding 12 and a single turn cast copper secondary winding 13. The transformer and its secondary winding connections have considerable reactance which plays an important part in the welding operation, as will be later explained. One terminal of the transformer secondary 13 is connected by means of bolts 14 to an electrode-carrying yoke 15 (see Fig. 1) on which is mounted a horizontal bar 16 at the left holding an elongated bar electrode 17 for serving for line welding; and supporting at the right an electrode holder 18 carrying an upright rod-shaped electrode 19 for spot welding. The electrode-holding bars 16 and 18 are fastened to the yoke 15 by the bolts 20 and 21. The opposite terminal of the transformer secondary 13 is connected by flexible cables to a roller electrode 22 and also to a reciprocating spot-welding electrode 23, a common end of the cable has been indicated at 24, (Fig. 2). A terminal 25 of a cable is shown in Fig. 5 attached to a shoe 26 bearing against the roller 22, and another terminal 27 is shown in Fig. 2 connected to the spot welding electrode 23.

By referring to Fig. 8, it will be observed that the spot welding electrodes 19 and 23 and the line welding electrodes 17, 22 are supplied from the same source of current. As indicated in Fig. 2, the secondary 13 is insulated from adjacent parts of the transformer casing 28 by electrical insulation 29 and the yoke 15 is insulated from opposite terminal 24 by the insulation 30.

The frame 31 carrying the roller electrode 22 is caused to slide in a step by step manner by a rack and gear mechanism (later described) on a stationary frame 32. Power is furnished by a motor 33, geared to a fly-wheel 34, which in turn reciprocates a hollow ram 35 (Figs. 3 and 4) by means of a rod 36 attached to an eccentric (not shown) carried by the fly-wheel shaft. The fly-wheel 34 is surrounded by a housing 37. The frame 38, carrying the spot welding electrode 23, is attached by bolts 51 to the ram 35 which is moved up and down within an undercut groove in the guide 39.

The screw-threaded shaft 40 on which the electrode 23 is mounted is adjustably secured to a guide 41, by a nut 42 and slides through a second guide 43. The spring 44, attached to a sleeve 54 resting on the guide 43, is compressed when a downward stroke of the frame urges the electrode 23 against the work.

As shown in Fig. 4, a ratchet wheel 45, through which power to operate the roller electrode 22 is transmitted, is connected to the frame 32 by a mechanism (later more fully described) comprising a bell crank lever 46, a link 47 and a lever 48 pivoted at 49, and attached to the ram 35 by a pin 50 which passes through a slot in the lever 48. When it is desired to disconnect the line welding mechanism in order to use the apparatus as a spot welder only, the link 47 is disconnected by removing either of the connecting pins 52 or 53.

The ratchet-wheel 45 (as best shown in Fig. 6) is mounted upon a shaft 55, in common with a gear wheel 56, shown also in dotted outline in Fig. 4. The gear wheel 56 engages with a rack 57 keyed to the movable carriage 31 carrying the roller electrode 22. When the gear wheel 56 is rotated counter-clockwise (Fig. 4) by the reciprocation of the ram 35, the carriage 31 moves to the right, causing the electrode 22 to move in a step by step motion over the work. Conversely, a clockwise motion of the gear wheel 56 moves the carriage 31 to the left. The carriage 31 contains a second rack 58 which engages with a gear wheel 59 attached fixedly to the hollow shaft 60 of the roller electrode 22 causing this electrode to be positively rotated. As illustrated, the gear ratio is such as to cause a slipping of the welding roller on the work but, if desired, a gear ratio may be used which will cause the roller electrode to move over the work without slipping.

Power is transmitted to the ratchet wheel 45 through one of the pawls 61, 62, pivotally connected to the lever 46, the engagement of the pawls depending on the position of the lever to the left or right of the vertical. The lever 46 is connected by a pin 63 to a slotted shifting member 64 attached to a rod 65 which in turn slides in the brackets 67 and 68. These brackets are attached to the frame 32. The pin 63 is connected by springs 69, 70, to pins 71, 72. The tension exerted by these springs causes the pin 63 to remain in a given position in the slot until pushed past the center to the opposite side of the slot. Slidably arranged on the rod 65 are detents 73, 74 and 75, two of which may be set to engage with the lug 76. As the welding carriage 31 moves forward and back causing one of the detents 73, 74 or 75 to engage with the lug 76, rod 65 is moved, causing the pin 63 to be shifted from one side to the other in the slot in the lever 46. The effect of a shift of the position of the pin 63 is to shift the engagement of the ratchet wheel 45 from one pawl 61, 62, to the other, thereby reversing the direction of travel of the welding carriage and the roller electrode 22.

When the pin 63 has moved to the extreme left and pawl 62 is engaging with the ratchet wheel 45, electrical connection is made by the paired contacts 78 with the contacts 79 (Figs. 3 and 4) which are in circuit with control magnets 80, 81 (Fig. 8) through the conductors 82, 83, 84, contact segments 85, 86, and a double pole switch 87. The contact segments 85, 86, are bridged by a switch blade 88 connected to the fly-wheel shaft 89 and, therefore, making contact with the segments 85, 86, for an interval during each revolution of the fly-wheel. The switch 87 being closed, and the contacts 78, 79 closed, the effect of a completion of the circuit by the switch 88 is to energize the magnets 80, 81, by current from a suitable source, such as a current circuit 90, causing the armature 91, 92, to be pulled up, closing the contacts 93, 94, and completing the primary circuit 95, 96, of the welding transformer. The magnet 80 is shown in some detail in Fig. 1 being fastened to a base 97, which is in turn attached by supports 98 to the frame of the welding machine.

The segments 85, 86, are so proportioned and the mechanical linking of the welding head, or carriage to the driving mechanism so arranged that the cycle of operation is as follows:

As the roller electrode 22 moves forward, the primary circuit of the welding transformer is closed. When this current reaches a welding value, the electrode moves forward. As the roller electrodes halt, the welding current is cut off by the bridge piece leaving the segments 85, 86. During the next half revolution of the fly-wheel, neither of the pawls engages with the ratchet wheel, hence as the contacts 99 are removed by the position of the lever 46 from the contacts 100 the electrical circuit remains open. During the next half revolution another forward movement of the roller electrode, and an extension of the line weld occurs. In other words, the roller electrode moves while welding, then stops, the welding current being cut off. This cycle is repeated to produce a continuous line weld.

Although the length of a welding stroke and the length of time the welding current is flowing may be varied with the character of the work and other conditions I may say that when welding metal plates of about $\frac{1}{16}$ inch in thickness, the mechanism preferably is so synchronized that the forward movement of the roller electrode is about $\frac{3}{8}$ of an inch during $\frac{3}{8}$ of a second, the welding current meanwhile flowing, then during $\frac{5}{8}$ of a second the roller electrode is stationary under pressure, the power being off. For heavier stock a somewhat slower speed is preferable.

When the lug 76 engages with the stop 74, the rod 65 is pushed to the left and moves past the center to cause the contacts 99 to engage with the contacts 100, in order to time the completion of the welding circuit with the engagement of the opposite pawl 61 with the ratchet wheel 45. The machine is now ready to make another line weld with the roller electrode moving in the opposite direction, the circuit now being completed by the switch 88 through the segments 101, 102. Hence, no time need be lost to run back the welding carriage to the starting position, after putting in another piece of work. The machine may be stopped by throwing the mechanism out of engagement with the power by means of the pedal 103 which is connected by a rod 104 with a clutch (not shown).

Mounted on the frame 10 of the welder is a controller 106 which is diagrammatically shown in Fig. 3 and is used to regulate the welding current by varying the number of turns of the primary winding 12. By moving the handle 107 contact may be established successively between the segments 108 and the contacts 109 connected to different taps on the primary winding 12 by the conductors 110. As this part of the apparatus is of well-known construction, it is believed the drawing will be understood without further description.

Although the mechanical construction of the roller electrodes may be varied without departing from the essentials of my invention, I have shown in Figs. 6 and 7, one particular form of roller electrode which has proved to be very efficient in actual practice. The roller electrode, as best shown in Fig. 7, consists of three parts, namely the welding annulus 114 held between two side members 115, 116, by the screws 117. As the welding annulus 114 becomes worn, it can be replaced by removing the electrode from its holder 118 by taking out the screws 119 and then removing the screws 117, which hold together the three parts of the roller electrode.

The roller electrode has a hollow interior to which a suitable cooling fluid, such as water, is supplied by a tube 120, the water being discharged through the hollow shaft 60. The tube 120 may conveniently consist of metal, such as brass and makes a bearing fit in the roller electrode. As shown in Fig. 6 it is steadied by being fastened to the holder 118. The level of the water in the roller electrode, as it revolves over the work, is as high as the mouth of the hollow shaft 60, and the water from thence is discharged to a gutter 122 in the frame and leaves the gutter by the spout 123. By this construction the water is always in the region where the weld is being made.

The holder 118 for the roller electrode is attached to a hollow sleeve 124 containing a spring 125 and reciprocating within the carriage 31. The tension of the spring may be adjusted by a screw threaded bolt 126 in order to adjust the pressure exerted by the roller electrode during the welding operation.

The pressure is uniformly and continuously exerted upon the work during the progress of the roller electrode over the seam being welded. The clamping action of the roller electrode upon the work may however be released by turning the handle 127, thereby causing the sleeve 124 to be moved against the action of the spring into the hollow frame 31, by means of a cam 128, in order to release the electrode from the work.

As already mentioned, the line welding mechanism may be disconnected by removing the link 47 and the machine used without further change as a spot welder.

What I claim as new and desire to secure by Letters Patent of the United States, is:—

1. The method of electric line welding which consists in applying welding electrodes to the work, impressing upon said electrodes a current rising intermittently to a value sufficient to produce welding, and moving said electrodes while in contact with the work during the intervals only when the value of said current is sufficient to produce welding.

2. The method of electric welding which consists in applying welding electrodes on opposite sides of the work, causing intermittent relative movement between the work and the electrodes while so applied, and applying a welding current to the work through said electrodes only during the intervals of feed.

3. The method of electric line welding which consists in applying electrodes under pressure to the work, impressing upon said electrodes an intermittent current, the heating effect of which periodically rises to a value sufficient to weld, controlling said current external to the weld and causing relative motion between said electrodes and the work only during the intervals when the heating effect of said current is sufficient to cause welding.

4. The method of electric welding which consists in applying electrodes under pressure to the work, impressing upon said electrodes an intermittent alternating current, the heating effect of which periodically rises to a value sufficient to weld during intervals materially longer than a cycle of said current, reactively controlling said current during these intervals, and moving said electrodes during the intervals when the heating effect of said current is sufficient to cause welding.

5. An electric resistance line welding machine comprising electrodes one of which is movable linearly over the work, the other electrode being adapted to support the work, means for causing intermittent relative linear motion between the work and said movable electrode, and means for supplying a welding current to said electrodes during said intervals of motion to the exclusion of intervening intervals of rest.

6. An electric resistance line welding machine comprising coöperating electrodes, means for causing step by step linear motion between work to be welded and at least one of said electrodes, means for impressing a welding current upon said electrodes, and means for timing the periods of current application to be substantially coincident with the periods of motion between said electrode and the work.

7. An electric resistance line welding machine comprising a welding transformer, electrodes connected to the secondary circuit of said transformer, one of said electrodes consisting of a roller, the other electrode being adapted to support the work, means for moving said roller electrode step by step over the work, and a circuit-closing mechanism connected to said means to time the energizing of said transformer substantially during the intervals of travel of said roller electrode while in welding relation with the work.

8. An electric resistance line welding machine comprising a bar electrode, a roller electrode adapted to engage the work in coöperation with said bar electrode, a carrier for said electrode, a frame on which said carrier is slidably supported, a rack connected to said carrier, a gear wheel mounted on said frame and engaging with said rack, a ratchet wheel connected to said gear wheel, a pawl engaging with said ratchet wheel, means for reciprocating said pawl to revolve said ratchet wheel to cause said rack and carriage to be moved stepwise, and means for impressing a welding current on said electrodes during the period of travel of said roller electrode.

9. A welding machine comprising a frame, a reciprocating ram supported by said frame, power means for driving said ram, a stationary electrode carried by said frame, a coöperating electrode connected to said ram and movable in and out of welding relation to said stationary electrode, a bar-shaped stationary electrode supported by said frame, a roller electrode coöperating with said bar-shaped electrode to make a seam weld, means for inter-connecting said ram and said roller electrode to move said roller electrode linearly in welding relation with work held by said bar-shaped electrode, a welding transformer and electrical connections for supplying either of said electrode sets with welding current.

10. A welding machine comprising a frame, a reciprocating ram supported by said frame, spot welding electrodes mounted in operative relation to each other on said frame, line welding electrodes also mounted on said frame, a pawl and ratchet mechanism for linearly displacing the engagement of said line welding electrodes relative to the work, and means for interchangeably connecting said spot welding electrodes and said pawl and ratchet mechanism to said ram.

11. An electric resistance welding machine comprising coöperating electrodes adapted to engage the work to be welded, a pawl and ratchet mechanism for linearly displacing the engagement of said electrodes and the work with a step by step motion, means for impressing a welding current on said electrodes, switching mechanism connected to close said welding circuit during intervals of motion of said electrodes and power means for operating said pawl and ratchet mechanism.

In witness whereof, I have hereunto set my hand this 24th day of April, 1918.

HENRY GEISENHÖNER.